United States Patent [19]
Ohlsson

[11] 3,902,609
[45] Sept. 2, 1975

[54] METHOD AND ARRANGEMENT FOR LOADING NEWSPAPER BUNDLES ON A PALLET

[75] Inventor: Nils Olov Allan Ohlsson, Handen, Sweden

[73] Assignee: Ahlen & Akerlunds Forlags AB, Stockholm, Sweden

[22] Filed: Dec. 14, 1973

[21] Appl. No.: 424,746

[30] Foreign Application Priority Data
Dec. 19, 1972 Sweden.............................. 16630/72

[52] U.S. Cl..................... 214/6 P; 198/27; 198/237; 214/1 Q; 214/6 C; 214/152
[51] Int. Cl.².......................................... B65G 57/24
[58] Field of Search.......... 214/6 P, 6 C, 6 DK, 6 D, 214/1 Q, 1 QA, 152; 198/27, 236, 237; 93/93 DP

[56] References Cited
UNITED STATES PATENTS

| | | | |
|---|---|---|---|
| 2,813,638 | 11/1957 | Miller................................. | 214/6 P |
| 3,014,600 | 12/1961 | Tray..................................... | 214/6 D |
| 3,164,080 | 1/1965 | Miller................................. | 214/6 P X |
| 3,388,815 | 6/1968 | Lingle................................. | 214/6 A |
| 3,633,727 | 1/1972 | Brenner.............................. | 198/27 |
| 3,675,790 | 7/1972 | Avril................................... | 214/6 P |

FOREIGN PATENTS OR APPLICATIONS

| | | | |
|---|---|---|---|
| 827,007 | 1/1960 | United Kingdom................. | 214/1 Q |
| 309,943 | 4/1969 | Sweden............................... | 214/1 Q |

*Primary Examiner*—Robert J. Spar
*Assistant Examiner*—Leslie J. Paperner
*Attorney, Agent, or Firm*—Ostrolenk, Faber, Gerb & Soffen

[57] ABSTRACT

A method and an arrangement for loading newspaper bundles on a loading pallet. The bundles are brought forward into position in front of a device which at the same time transfers a row of bundles on to another device which in turn deposits the row of bundles on the pallet or on one or more rows of bundles on the pallet. Before arriving at the position in front of the transfer device, the bundles constituting a row of bundles, in order to have the required alignment in the row, are oriented in the horizontal plane into one of four positions spaced at 90° from each other, by rotation. After transfer to the depositing device, the bundles are inverted by this device while clamped together in the direction of their height, before being deposited on the pallet or on the row or rows of bundles thereon. The arrangement comprises a conveyor, for example in the form of a roller conveyor, a driven endless conveyor belt or the like, which brings the bundles to a position in front of a device for simultaneous transfer of a row of bundles on to a further device which in turn deposits the row of bundles on the pallet or on the row or rows of bundles thereon. Also included in the arrangement is a rotating device positioned upstream of the transfer device, viewed in the direction of bundle flow.

10 Claims, 8 Drawing Figures

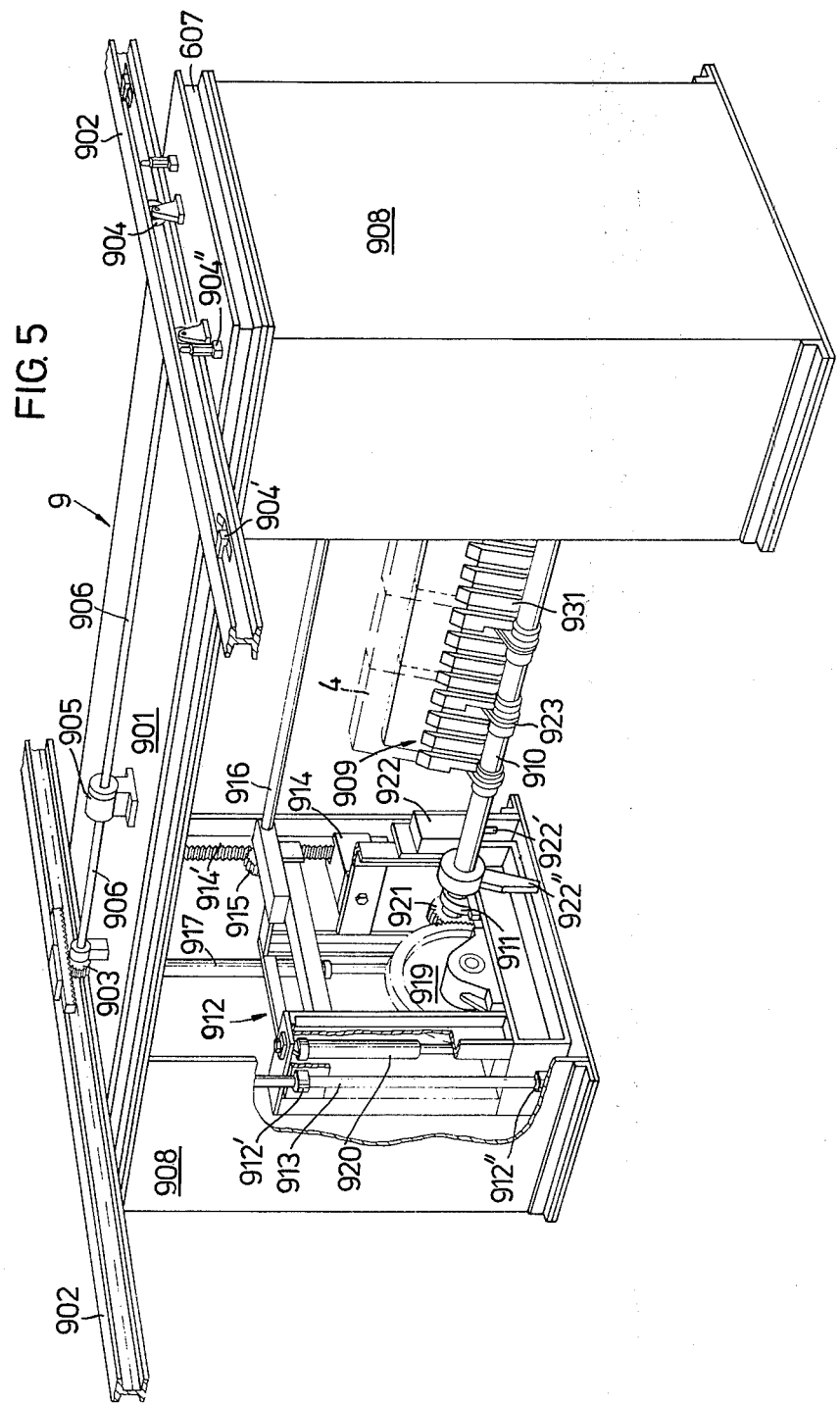

METHOD AND ARRANGEMENT FOR LOADING NEWSPAPER BUNDLES ON A PALLET

When newspaper bundles are loaded on pallets the bundles have, for several reasons, proved to be very much more difficult to handle than, for example, sacks or cartons, since each bundle usually contains several tens of newspapers, which shift easily relative to each other during handling so that the sides of the bundles become irregular, making the bundles more difficult to load. Moreover, when several bundles are stacked on each other, there is a distinct risk of the stack toppling over. In addition the spines of the newspapers are usually at the same side of the bundle, and this side consequently becomes higher than the opposite side. This fact limits the number of newspapers that can form a free standing bundle and, in mechanized pallet loading, this has been shown to result in instability of the stacks on the pallets.

These disadvantages have partly been eliminated in a known arrangement for loading newspaper bundles on pallets. The arrangement includes a depositing mechanism which can be raised and lowered, and which has flaps on to which a row of paper bundles is pushed, whereupon the flaps open and the row of bundles is deposited on a pallet carried by a conveyor. The driving devices for raising and lowering the depositing mechanism of this known arrangement, for operating the flaps and for driving the pallet conveyor are synchronized in such a way that the depositing mechanism, when depositing a row of bundles alongside another row of bundles on the pallet, is lowered to a lower turning position, at which the flaps are opened in order to deposit the row of bundles, whereupon the depositing mechanism is lifted to an upper turning position, at which the flaps are closed and a new row of bundles is pushed in onto the flaps; that the pallet, supplied to the conveyor from a pallet stack, is moved forward or backward one step into a position for the reception of a further row of bundles resting on the flaps of the depositing mechanism, this further row of bundles being deposited only when the depositing mechanism has once again been lowered to the lower turning position; and that the flaps consist of two horizontal rectangular plates arranged parallel to each other and pivoted on bearings at their outer long edges so that they can pivot between a horizontal position and a vertical position; and that the distance between the pivoting axes of the flaps is approximately equal to the width of the row of bundles, so that the opened flaps form side support plates when the row of bundles is deposited. To ensure the shortest possible drop when the bundles are deposited at the lower turning position of the depositing mechanism, the total width of the flaps is preferably less than half the width of the row of bundles.

This known machine does indeed ensure that the sides of the bundles are regular, thus reducing the risks of the stacks toppling over, but unfortunately the machine has not proved itself capable of producing truly stable pallet loads, especially as it cannot load in such a way that the various rows of bundles or layers of bundles on the pallet interlock.

The purpose of the present invention is to eliminate all the disadvantages touched upon here, by describing, on the one hand, a suitable method for pallet loading of newspaper bundles, and on the other hand, an arrangement suitable for executing this load method.

Assuming initially that, through the pallet loading arrangement described here in the introduction, the technique is already known for the loading of newspaper bundles on a loading pallet, of feeding the bundles into position in front of a device which at the same time transfers a row of bundles on to a further device, which in turn deposits the row of bundles on the pallet or on one or more rows of bundles thereon, a method of achieving the stated purpose is proposed, according to the invention, which is chiefly characterized in that, before arriving at the position in front of the transfer device, the bundles constituting a row of bundles, in order to have the required alignment in the row, are oriented in the horizontal plane into one of four positions spaced at 90° from each other, by rotation, and that after transfer to the depositing device, the bundles are inverted by this device while clamped together in the direction of their height, before being deposited on the pallet or on the row or rows of bundles thereon.

It has been shown in practical experiments that use of the method according to the invention affords regular bundle sides and can load the rows of bundles in such a way that, by reason of suitable overlapping between the rows in the different layers on the pallet, the bundles interlock both within the same layer and with adjacent layers, and so that full allowance can be made for the spines of the bundles, which can be oriented alternately from one row and/or layer to the next, consequently giving the greatest possible uniformity and optimum stability of the complete pallet load. Also according to the invention, the bundles are oriented in the horizontal plane by rotation to one of four positions spaced at 90° from each other thus the depositing deivce can be supplied by the transfer device with bundles oriented in advance so as to take account of the required structure of the pallet load, in order to achieve optimum interlocking between the rows of bundles.

In order that neither the various bundles nor the individual newspapers in the bundles shall move relative to each other when a row of bundles transferred to the depositing device is inverted, the row of bundles is clamped, preferably along one of its edges on the depositing device, and specifically along the edge above which the row of bundles is rotated.

In addition to the advantages already mentioned here, the method according to the invention also has the advantage that owing to its flexibility, it is very simple to adopt even where the space for putting the method into practice is small, is available on different levels or has an irregular surface. The main reason for this is the fact that the depositing device and the pallets can be moved both horizontally and vertically relative to each other, as required. For example, the depositing device, loaded with a row of bundles can, when depositing this row of bundles on the pallet, be moved both horizontally over the pallet and vertically relative to it; or, for the same purpose, the pallet can be moved horizontally under the depositing device as well as vertically relative to it, depending on the required loading height. In addition to the possibilities mentioned here, there are numerous other combinations of the relative movements between the depositing device and the loading pallets.

In the practical experiments mentioned earlier, a particularly well suited arrangement for execution of the method according to the invention proved to be one which, on the basis of the known machine described in the introduction, includes at least one conveyor, for example in the form of a roller conveyor, a driven endless conveyor belt or the like, which positions the newspaper bundles in front of a device for simultaneous transfer of a row of bundles to a further device which in turn deposits the row of bundles on the pallet or on one or more rows of bundles thereon. The innovation in this arrangement and the features that essentially characterize it according to the invention, is that it also includes a rotating device, positioned upstream of the transfer device, viewed in the direction of bundle flow, the said device being capable of rotating in the horizontal plane so as to take up four different positions spaced at 90° from each other, and which, by taking up one of these positions, orients the bundles so as to achieve the desired alignment in the row, and that the depositing device consists essentially of a flap capable of turning or pivoting through a sector of about 180° back and forth, and which, during its working motion, carried, clamps down, inverts and deposits a row of bundles.

In order to give the bundles transferred to the depositing device suitable support when they are inverted for depositing on the pallet, the depositing device can be fitted, along the edge around which the flap turns or pivots, with a device to clamp the bundles in the directions of their heights and to hold them in position on the flap. This device can be executed in several different ways but consists, in an embodiment which has shown itself to give particularly good support not only to the individual newspapers in each bundle but also to the individual bundles and the entire row of bundles, of a gripping device partly enclosing the row of bundles and movable between active and inactive positions, further features of a suitable gripping device of the kind in question are shown on an execution example for a device according to the invention, described below.

To guarantee fully the possibilities in practical application of the previously mentioned great flexibility of the method according to the invention, particularly with regard to small premises, premises on different levels or with an irrgular surface, at least one of the depositing devices and the device carrying the pallet should be capable of being moved back and forth relative to the other in a direction at right angles to the longitudinal axis of the depositing device, and with the depositing device situated above the pallet; the highest degree of adaptability can be achieved if at least one of the depositing device and the pallet, the latter by means of a device carrying it, is movable vertically relative to the other, and with the depositing device situated above the pallet.

The invention will be described in greater detail below with reference to an example of execution of the invention shown on the attached drawings.

FIG. 5 is a perspecitve view of an embodiment, forming part of the arrangement or installation shown in FIGS. 1 and 2, of a device for depositing the row of bundles coming from the tranfer device in the required position on the loading pallet;

Figure 1:
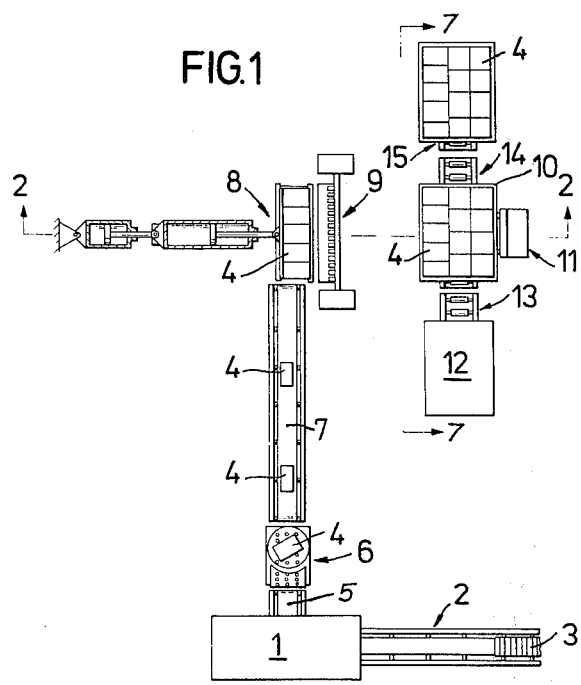
FIG. 1 shows a schematic plan view of an arrangement according to the invention, indicating how the various units constituting such an arrangement or installation can be positioned relative to each other.

FIG. 1 shows how an arrangement or installation according to the invention can be positioned relative to a known bundling machine 1. Via a conveyor 2 the bundling machine receives a steady flow 3 of newspapers from a printing press not shown and stacks these on each other to form complete bundles 4 of a particular height or containing a particular number of newspapers. These bundles 4 are ejected from bundling machine 1 on to a suitable conveyor, for example in the form of a conventional belt conveyor 5, which transfers the bundles to a turntable 6. This turntable, which will be described in greater detail below incorporates a device adjustable in the horizontal plane between several distinct positions, and which can be set, by rotation, to one of four positions spaced at 90° from each other. By means of turntable 6, all the bundles 4 transferred to the turntable from bundling machine 1 via conveyor belt 5 are oriented in the horizontal plane into one of the positions at 90° intervals mentioned above, so that from then on, rows of bundles with the required alignment of the individual bundles in the rows can be achieved. From turntable 6 the appropriately oriented single bundles 4 are transferred to one or more further conveyors, for example in the form of belt and/or roller conveyors 7, which convey and gather the bundles 4 into rows in position in front of a transfer device 8. This device, which will be described in greater detail below, simultaneously transfers a complete row of bundles consisting of, for example, five standing or four lying bundles, on to a depositing device 9. This device, which will also be described in greater detail below, first inverts the rows of bundles transferred to it and then deposits them in the required position on a loading pallet 10 or on one or more rows of bundles thereon. As well as in FIG. 1, this is shown particularly clearly in FIG. 2, where arrows indicate the movements of transfer device 8, depositing device 9 and loading pallet 10 in the embodiment of the invention shown here.

As the arrows indicate, in the embodiment shown here, depositing device 9 can, when carrying a row of bundles, be moved both vertically relative to loading pallet 10 and horizontally across the pallet when depositing the rows of bundles in the required positions. The said arrows in FIG. 2 also show that a loading pallet 10 can be carried on a lifting platform 11, by means of which pallet 10 can be moved vertically relative to depositing device 9, depending on the height of the load on the pallet. Empty pallets 10 are supplied to lifting platform 11 from a pallet stack 12 by means of roller conveyors 13, 14 or the like, whilst a fully loaded pallet is conveyed away from lifting platform 11 by means for example, of roller conveyors 14, 15 or the like.

In addition to the possible relative movements shown here between depositing device 9 and loading pallet 10, and an arrangement such as lifting platform 11 carrying the pallet, there can be other possible motions. However, the essential feature is that at least one of the depositing device 9 and the arrangement carrying loading pallet 10 can be moved back and forth relative to the other in a direction at right angles to the longitudinal axis of the depositing device and with the depositing device situated over the loading pallet. In addition, at least one of depositing device 9 and loading pallet 10, the latter by means of the arrangement carrying it, should be capable of moving vertically relative to the other.

Switching of the various driving mechanism for the different units incorporated in the illustrated arrangement according to the invention is controlled by a sequencing unit, which may be electro-mechanical or may be in the form of a minicomputer or the like, and which is set up so as to give the appropriate order and sequence for the required switching impulses.

Figure 3:
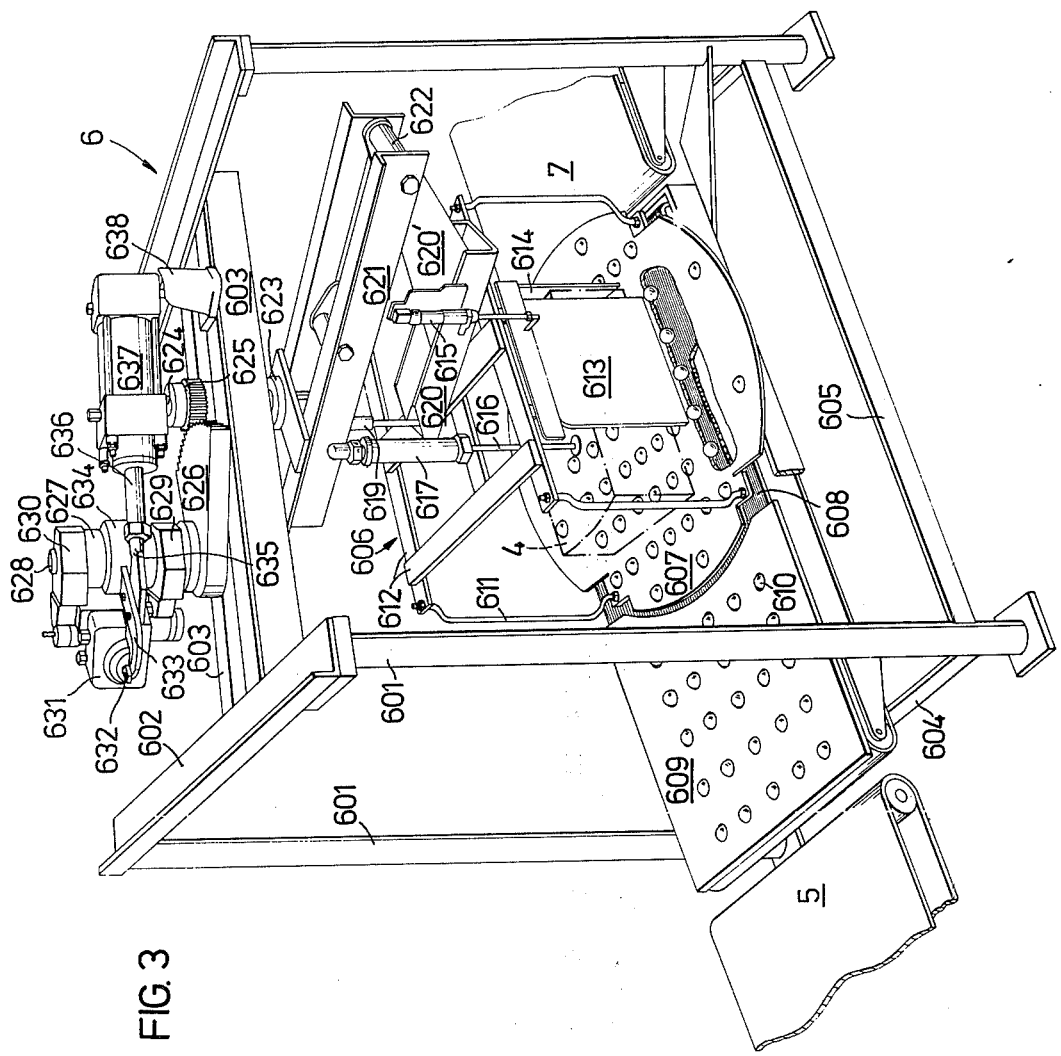
FIG. 3 is a perspective view of a turntable to orient the newspaper bundles in the horizontal plane into one of four positions spaced at 90° from each other, and forming part of the arrangement or installation shown in FIG. 1.

The appearance of turntable 6 is shown in FIG. 3, which shows the turntable seen in perspective obliquely towards one of its long sides. As already shown in FIG. 1 turntable 6 is positioned after conveyor 5 leading from bundling machine 1, and consists essentially of a frame of angle or tubular sections with vertical corner pillars 601, horizontal lateral and longitudinal upper cross-members 602 and 603 respectively, acting as struts for the said corner pillars, and similarly horizontal lateral and longitudinal lower cross-members 604 and 605 respectively. Within this frame a cage 606 which can be raised, lowered and rotated in the horizontal plane is mounted.

In its lowered position shown in FIG. 3, cage 606 rests with the underside of its floor 607 on a conveyor belt 608 mounted in the frame and extending along its longitudinal direction; this conveyor belt is driven in the opposite direction to the direction of motion of the newspaper bundles 4 through the arrangement. Since the floor 607 of the cage, and a conveyor surface 609 rigidly mounted in the frame upstream of the cage in the direction of movement of the newspaper bundles through the device, but level with the bottom of the cage in its lowered position, consists of two plates, between which balls 610 are mounted so that they partly project freely upward and downward through rows of holes in the plates, bundles 4 conveyed by conveyor belt 5 to the conveyor surface 609 on turntable 6 can be conveyed further on conveyor surface 609 and on to floor 607 of the cage, and then out from the cage, by reason of a rolling motion applied to balls 610 held between the plates by conveyor belt 608 running in the opposite direction under conveyor surface 609 and cage floor 607. This rolling motion of the balls 610 held between the pairs of plates imparts a forward motion to bundles 4 from conveyor 5 towards cage 606 and on from the cage to conveyor 7 positioned downstream of turntable 6.

However, as already mentioned, the true purpose of turntable 6 is to orient bundles 4 arriving in it to one of several distinct positions in the horizontal plane, more specifically to one of four positions at 90° intervals, by rotating the bundles. In the embodiment of the turntable shown here, this rotation is achieved by means of cage 606.

The construction of cage floor 607 on which the bundles 4 rest during rotation has already been described. In plan this floor is circular and from it project four struts 611. The upper ends of these struts are connected together by a frame 612. On the frame there are two support plates 613 and 614 for bundles 4 situated in the cage; the support plates are arranged at right angles to each other on hinges and can be swung up and down relative to the cage floor, each by means of a pneumatic ram 615 arrached to frame 612. With these support flaps the bundles 4 can be supported during rotation of the turntable and, if necessary, pushed so as to make the sides of the bundles regular. In order to retain the bundles on the turntable during rotation there is a pneumatic ram 617 attached vertically to frame 612. The reciprocating movements of piston rod 616 of this ram are used, together with the freely projecting piston rod end pointing towards a bundle 4 situated in the cage, alternately to retain and release this bundle.

In order that it shall be possible to turn cage 606 without balls 610 situated in the cage floor and driven by continuously running belt 608 causing undesired movement of a bundle 4 in the cage, before the cage begins to rotate it is raised sufficiently for balls 610 in the cage floor no longer to make contact with the moving belt 608, whereupon the balls become stationary. More specifically, the lifting of cage 606 is achieved by means of a ram 619 attached between a cross-piece 620 rigidly attached to cage frame 612 and a beam 621 positioned above the cross-piece, cage 606 being connected in an articulate manner at 622 via its cross-piece 620 and a bracket 620' attached to one end of the cross-piece. When the cage is to be lifted, ram 619 moves the free end of cross-piece 620 towards beam 621, so that frame 612 of cage 606 attached to the cross-piece follows and the entire cage with the bundle 4 that it contains is lifted sufficiently to move balls 610 in cage floor 607 out of contact with continuously running belt 608 below the cage. Not until this position is reached can the required rotation of cage 606 take place.

For rotation of cage 606, which takes place essentially in the horizontal plane, beam 621 is rigidly connected at 623 with a vertical journal 624 which carries beam 621 and cage 606 and which is free to pivot in the horizontal longitudinal cross-member 603 and projects above it, where it carries a pinion 625 fitted to it by, for example, keying. In order to apply to pinion 625 and cage 606 connected to it the rotary movements necessary according to the invention, a toothed segment 626 meshes with the pinion. Like pinion 626, this toothed segment 626 is situated above the horizontal longitudinal cross-member 603 of turntable 6 and is rigidly connected to the sleeve 627 which can rotate on a journal 628 rigidly attached to these cross-members and projecting vertically upwards from them. Sleeve 627 capable of rotating on journal 628 rigidly fixed to the turntable is not only rigidly coupled to toothed segment 626, but also to a bearing stand consisting of two parts 629 and 630, supporting a ram 631 which can pivot on the sleeve. The free end of the piston rod of ram 631 is articulated to a lever 633 which can rotate on the also rotating sleeve 627 by means of a hub 634. Also articulated at 635 to lever 633 which can rotate on sleeve 627 is the free end of piston rod 636 of a further ram 637, whilst the opposite end of ram 637 itself is articulated at a strut 638 rigidly mounted on top of the longitudinal upper cross-member 603 of the turntable frame.

The required rotary motions of cage 606 into one of four positions at 90° invervals can easily be brought about by the arrangement with lever 633 capable of rotating on rotating sleeve 627, and which can both rotate on the sleeve and be held in particular positions on it by one of the rams 631, attached to the sleeve itself, and 637, attached to the turntable frame, and toothed segment 626 rigidly mounted on sleeve 627 and meshing with pinion 625 rigidly coupled to the rotatable cage. The lever 633 capable of rotating on sleeve 627 can, in order to achieve the said motions, conveniently be fixed in position on the sleeve by means of ram 631 mounted rigidly thereon, whilst sleeve 627 with toothed segment 626 rigidly mounted on it and therefore also pinion 625 and cage 606 are turned, for example to the 0° and 180° positions by means of ram 637 attached to the turntable frame via the piston rod 636 and the lever 633, held in position on the sleeve by ram 631, since lever 633 is held in position on the sleeve, the sleeve rotates on its journal 628 and therefore also turns toothed segment 626, pinion 625 and cage 606 to the positions for the rotation of 0° and 180°.

Correspondingly, the positions for ±90° can be obtained by fixing lever 633 relative to the turntable frame by means of ram 637 mounted thereon, whilst sleeve 627 with toothed segment 626 mounted on it and therefore also pinion 625 and cage 606 are turned to the positions for ±90° by ram 631 mounted on the sleeve itself.

The rams 631 and 637, intended for rotation of the cage, the rams 615 for operation of support plates 613 and 614, and ram 617 to retain the bundles 4 in cage 606 are, in the embodiment shown here, all of pneumatic type, that can equally well be hydraulic without thereby deviating from the present invention. The continuously driven conveyor belt 608 in turntable 6 can be driven in a suitable conventional manner. The rams and the conveyor belt are controlled by an electromechanical sequencing unit, a mini-computer or the like, as already mentioned, and programmed to give the required order and sequence for the control impulses to the various driving mechanisms.

Figure 2:
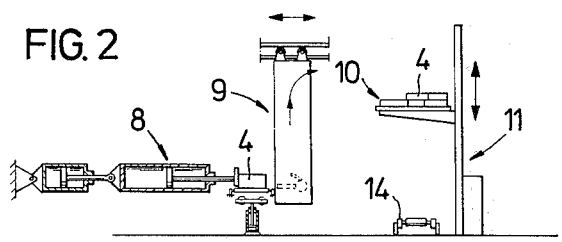
FIG. 2 is also a schematic view seen along the line 2—2 in FIG. 1.
Figure 4:
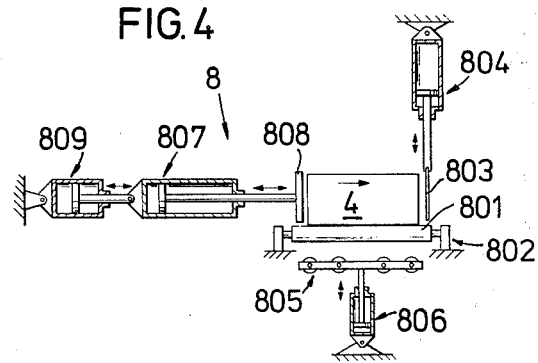
FIG. 4 is a schematic view of a device forming part of the installation shown in FIG. 1, for simultaneous transfer of a row of bundles from a conveyor to a device for depositing the row of bundles in required position on a loading pallet.

The transfer device 8 can be executed in numerous ways. The essential feature is that it must be so designed as to be capable of simultaneously transferring a row of bundles 4 on to depositing device 9, which then deposits this row of bundles on loading pallet 10. In order to achieve this purpose the transfer device 8 can, for example, be constructed in principle in the manner shown in FIG. 4. As FIG. 4, in conjunction with FIGS. 1 and 2, shows, the transfer device 8 is arranged after conveyor belt 7. It can conveniently include a roller conveyor 801 arranged as an extension of conveyor 7, and the rollers of conveyor 801 can conveniently be mounted so that they are free to rotate in frame 802 of transfer device 8, only indicated in FIG. 4. A suitable number of bundles 4, for example four lying or, as in FIG. 1, five standing, coming from conveyor 7 and appropriately oriented by turntable 6, are transferred to this conveyor and gradually gathered to form a row. When a row is complete on roller conveyor 801, a screen 803 at the end of the row facing towards depositing device 9 is withdrawn by means of a ram 804 attached to the frame of the transfer device. Thereupon a system of roller discs 805, each positioned at right angles to the longitudinal direction of roller conveyor 801, is inserted from below between each of the rollers of roller conveyor 801 to a level above the upper surface of roller conveyor 801, by means of a ram 806 attached to the frame. Thus the separate bundles 4 in the row of bundles will each be raised from roller conveyor 801 to rest instead on the roller discs 805 projecting above it, on which the row of bundles is then rolled out as a unit at right angles to roller conveyor 801 and is thus transferred to depositing device 9. The rolling or transfer is itself achieved in the embodiment shown, by means of a ram 807 acting on a controlled ejector plate 808 situated on the opposite side of roller conveyor 801 from depositing device 9. In order always to guarantee complete ejection from the transfer device and correct insertion in depositing device 9, regardless of whether the row of bundles to be transferred consists of standing or lying bundles, ejector plate 808 should be so placed in its active and inactive positions that it takes account of whether the row of bundles to be transferred consists of lying or standing bundles. This can be achieved, for example in the manner shown in FIG. 4, in which ram 807, together with ejector plate 808 can both be moved back and forth by means of a further ram 809 attached to the frame, by means of which the ejector plate can thus be set to the required end position with inactive ram 807.

As at turntable 6 the rams in transfer device 8 are controlled by the sequencing unit mentioned earlier.

The depositing device or depositor 9 is intended, as already mentioned, to invert the rows of bundles transferred to it by the transfer device 8 and to deposit them on a pallet 10. For this purpose depositor 9 is positioned, as shown in FIGS. 1 and 2, in such a way relative to transfer device 8, that the rows of bundles ejected from transfer device 8 slide directly across from the roller discs 805 of the transfer device to a pivoting flap 909 on depositor 9, the flap being level with these roller discs at the time. This pivoting flap 909 will be described in greater detail below and constitutes the essential means in depositor 9 as regards the present invention; the appearance of depositor 9 is shown in FIG. 5, which is a perspective view of the depositor seen obliquely towards its depositing side, the side facing a pallet 10.

As FIG. 5 shows, the embodiment shown here of depositor 9 according to the invention consists largely of a carriage 901. This is arranged to hang below a track consisting of two parallel girders 902 and fixed, for example, to the underside of a roof. On this track the carriage can be propelled back and forth by means of drive pinions 903 and support wheels 904, between end of position-defining striker 904' permanently fixed in the loading position and an optional number of position-defining devices for orientation of the rows of bundles on the pallet, by means of an electric motor 905 which is coupled, for example, via shafts 906 and gearing not shown, to the carriage drive pinions meshing with the track. At the top carriage 901 consists of a frame 907 made up of girders, the top of which carries drive pinion 903, motor 905, shafts 906 and switches 904'', which are intended to interact with the end-position-defining strikers 904' mounted on the track. At either end frame 907 is fitted with box-like structures 908 hanging down, giving the carriage the general appearance of a portal.

In order to afford the necessary rigidity, the hanging box-like structures 908 are made of fairly rigid sheet and angle sections assembled to each other and to frame 907 by means of bolts, for example. The inward facing sides of the two box-like structures are open and carry between them the pivoting flap 909 essential for depositor 9; the flap can be turned or pivoted back or forth around its length over a sector of about 180° and during its working motion, carries, inverts and deposits on a pallet 10 a row of bundles transferred to depositor 9 from transfer device 8.

Figure 6:
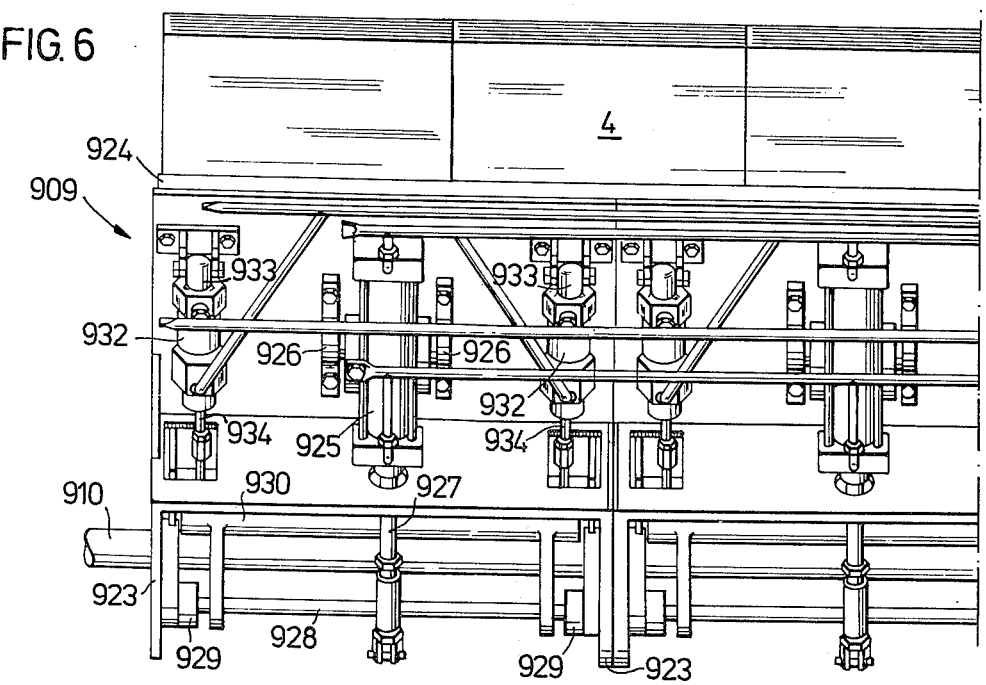
FIG. 6 is a perspective detailed view of part of the underside of a pivoting flap forming part of the depositing device shown in FIG. 5.

As FIG. 5 shows, together with the perspective view on a larger scale in FIG. 6, the pivoting depositing flap 909 is mounted on a shaft 910 which rotates at either end in two bearing stands 911. The bearing stands 911 are in turn rigidly mounted on essentially parallelepipedic blocks 912 which may conveniently be made up of girder sections, and which can move vertically in the two hanging box-like structures 908 of carriage 901. For this purpose blocks 912 are fitted on one side of a pair of sliders, an upper slider 912' and a lower 912", by which they slide on a vertical guide bar 913 mounted on each of the box-like structures 908. The opposite sides of blocks 912 have a single slider 914 which engages with the racks 914' mounted vertically on the box-like structure 908, and obtains guiding from these. At the top, each of the two blocks 912 has an attachment for a pinion 915 on this side, which meshes with the vertical rack engaging the relevant block and which is also coupled via a shaft 916 to block 912 at the opposite end of depositing flap 909. The fact that this shaft connects the two pinions 915 together ensures that the two blocks 912 carrying depositing flap 909 move synchronously in the vertical direction in box-like structures 908 on carriage 901. The actual vertical motion of the two blocks 912 and depositing flap 909 can conveniently be achieved by means of a pneumatic ram 917 arranged vertically in each of the box-like structures 908 of the carriage, with the upper end attached to a bracket, not shown here, on the underside of carriage frame 901, and the lower end attached to a spigot, not shown here, projecting from the rear block 912.

In order to achieve the turning or pivoting action of depositing flap 909 back and forth across the above-mentioned section of about 180°, a gear 919 is fitted inside both blocks 912 carrying the flap; this gear is cranked to a ram 920, which may be pneumatic, for example, and which is of the two-way type and therefore capable of moving gear 919 back and forth. As gear 919 meshes with a gear of smaller diameter 921 then gear 919, mounted rigidly on the relevant end of shaft 910 of flap 909, flap 909 can therefore be turned or pivoted to the required extent by means of the two rams 920.

On one side, more specifically the same side as the pinion 915 which synchronizes the vertical motions of the blocks and which meshes with rack 914', each of the blocks is fitted with a hydraulic damper 922 with a striker 922' pointing vertically downwards; at the end of the motion of the flap, striker 922' comes up against an interacting lever-like striker 922" on shaft 910 projecting in the opposite direction to flap 909 on this shaft.

In the embodiment shown here the turning or pivoting flap 909 consists, for example, of three sections only indicated by broken lines in FIG. 5, which are identical to each other and are mounted end to end on shaft 910 already mentioned, with a bracket 923 at each end of the separate sections. In addition, the sections are held together by a plate 924, which is intended to be supplied with a row of bundles by transfer device 8. As FIG. 6 shows, each of the sections of flap 909 is fitted with a ram 925, which may be pneumatic, for example. The ram is mounted with limited freedom of motion in a pair of bearing stands 926 on the underside of the flap and is coupled through its projecting piston rod 927 via a lever with shaft 928, which is individual for the flap section in question and extending between the ends of the section is mounted in bearings 929 at the ends so that it can rotate. Rigidly mounted on this shaft is a cam 930 which pivots with the shaft, and which is intended to press against bearing surfaces on push rods and control rods not shown here and projecting by sliding through the lower end of the flap; the purpose of the cams is to open a gripping device consisting of several gripping element 931, the third gripping device being attached at the edge of the depositing flap 909 across which the flap turns of pivots, and is intended, during inversion of a row of bundles by the flap, to support and/or fix the row of bundles in position on the flap. Closure of the individual gripping elements 931 constituting the gripping device, and holding of the row of bundles on flap 909 is achieved, for example, by at least part of the push rods or control rods being spring loaded in such a way that the associated gripping elements 931 are pressed against plate 924 when the cam 930, actuated by ram 925, no longer makes contact with the bearing surfaces of these rods.

The three different flap sections also each have two further rams 932, which may also be pneumatic. These rams 932 are fixed at 933 to the relevant section and are linked with their projecting piston rod ends 934 to a system of levers such that all clamping elements 931 belonging to the flap sections can, on the instant when depositing flap 909 deposit a row of bundles on pallet 10, be swung back over such a large angle that the gripping elements, which immediately before were opened by ram 925 and released the bundle from the flap, can be withdrawn and do not prevent the bundle being deposited in the required position or affect its location in this position when the flap swings back to its loading position after transfer device 8.

When depositing flap 909 in the loading position immediately behind transfer device 8, all its gripping elements 931 are still withdrawn and kept completely open. After a row of bundles has been loaded on to the flap, however, they are brought forward into their working positions by rams 932 and gradually closed by spring force as ram 925 withdraws cam 930 from the push rods associated with gripping elements 931. In this way the row of bundles is both reliably supported and retained at one of its edges during the motion of depositing flap 909; the said motions begin, in the embodiment shown here, with a horizontal travel motion of carriage 901 on the track consisting of girders 902 towards and over pallet 10 to a position determined in advance by the required pallet loading pattern and in this position the row of bundles is then deposited by depositing flap 909 inverting it and releasing its grip.

Immediately after depositing flap 909, during its active pivoting motion, has passed the vertical position it is released from the driving mechanism which produce its pivoting motions, that is, from pneumatic rams 920, the return sides of which are centred by means of a pressure relief valve. Thus flap 909, by reason of its own weight plus that of the row of bundles will continue its pivoting motion under the action of gravity. The motion in question is therefore a falling motion controlled by the fact that flap 909 is able to pivot at one edge by means of shaft 910. As a consequence of this falling motion, the outermost newspapers in the various bundles do not have time to swing out from the bundles and separate them; on the contrary, the bundles will still be held together as units during the entire inversion process and during depositing.

Towards the end of the falling motion flap 909 is braked by the dampers already mentioned at either end of flap 909 carriage 901, in order to ensure that the impact against loading pallet 10 or the rows of bundles already deposited thereon is not unduly abrupt.

Depending on the required pallet loading pattern, the driving mechanism of depositing device 9 are controlled by the sequencing unit already mentioned. It should be noted that all rams in the arrangment are of the two-way type.

Figure 7:
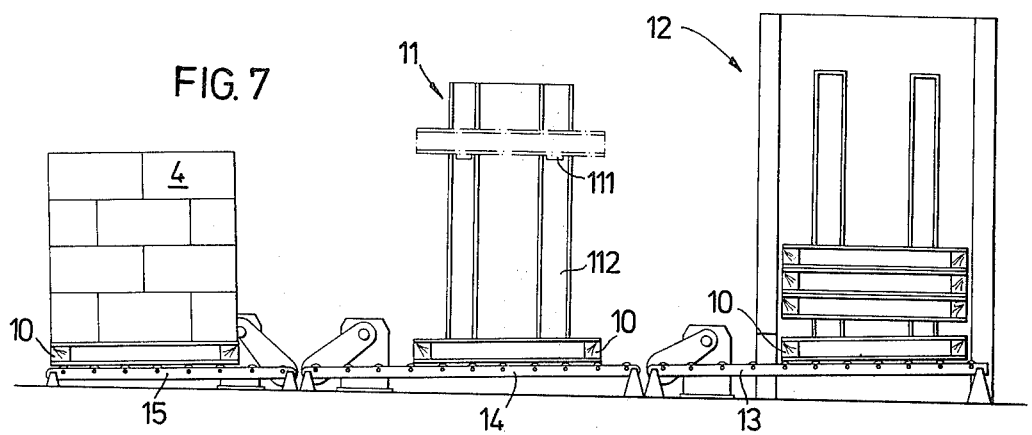
FIG. 7 is a view along the line 7—7 in FIG. 1 of a lifting table for loading pallets with associated conveyors and a stack of empty pallets; and finally.
Figure 8:
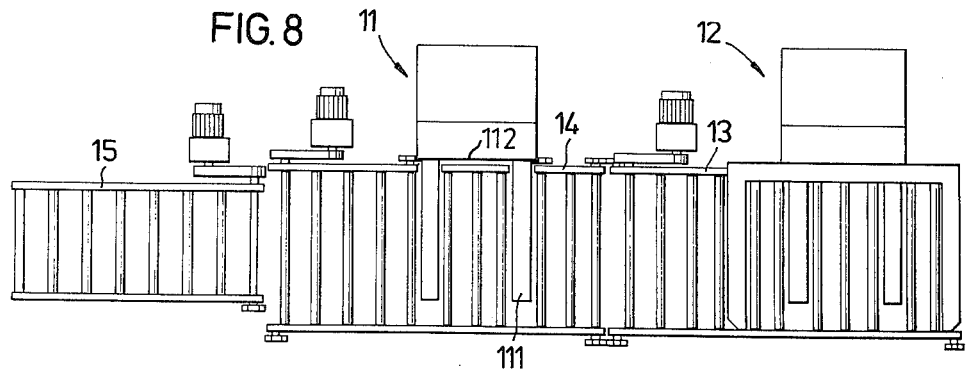
FIG. 8 shows a plan view of the installation shown in FIG. 7.

Lifting platform 11 of loading pallet 10 can, as shown in FIGS. 7 and 8, be of conventional type. They consist of a fork 111 so arranged that it can be raised and lowered pneumatically or hydraulically in a frame 112. Empty loading pallets 10 are supplied to this frame from a pallet stack 12 of conventional type by means of two driven conveyors 13 and 14 of the roller type for example; the latter of these two conveyors is also used to convey full pallets away from loading platform 11 in its lowest position to a further conveyor 15 on which the fully loaded pallets can be collected by a fork-lift truck of the like. Lifting platform 11 and the associated conveyors 13, 14 and 15 also receive their control impulses from the sequencing unit mentioned earlier.

The invention is not restricted to the example of execution described here and shown on the drawings, but can be modified in numerous ways within the scope of the claims.

What is claimed is:

1. A method for loading a first plurality of newspaper bundles on a loading pallet, each of said first plurality of bundles including a second plurality of loosely stacked newspapers having their spines aligned in a common direction, which method comprises the steps of:

conveying each of said first plurality of bundles in serial manner onto a turntable;
   rotating the turntable in either angular direction in the horizontal plane to one of four positions spaced at 90° from each other;
   supporting at least two sides of said each bundle during the rotation thereof;
   conveying each said rotated bundle from said turntable to a transfer device without disturbing the horizontal alignment of said spines;
   forming a third plurality of rotated bundles into a row on a flap of said transfer device;
   completely and firmly clamping an edge of said row of said third plurality of bundles in the direction of the height of each bundle;
   simultaneously rotating and inverting said clamped row of said third plurality of bundles about said clamped edge;
   depositing said inverted row of said third plurality of bundles on said pallet; and
   releasing said clamped edge of said third plurality of bundles immediately prior to depositing said row of said third plurality of bundles on said pallet.

2. A method as defined in claim 1, further comprising the step of moving said transfer device carrying a row of said third plurality of bundles over the pallet prior to depositing the row of bundles.

3. A method as defined in claim 1, further comprising the step of moving said pallet horizontally under the said transfer device flap prior to depositing the row of bundles.

4. A method as defined in claim 1, further comprising the step of depositing at least one row of a fourth plurality of bundles on top of said third plurality of bundles previously deposited on said pallet.

5. A method as defined in claim 1, further comprising the step of moving the transfer device flap in a vertical direction relative to the pallet prior to depositing any row of bundles thereon.

6. A method as defined in claim 4, further comprising the step of moving said pallet in a vertical direction relative to the transfer device flap as the height of a loaded pallet increases.

7. An arrangement for loading a first plurality of newspaper bundles on a loading pallet, each of said bundles including a second plurality of loosely stacked newspapers, each of said newspapers having a spine initially oriented in a common direction, said arrangement comprising:

a turntable having a substantially horizontal top surface;
   first means for selectively rotating said turntable about a vertical axis thereof in either horizontal direction to one of four positions spaced 90° from each other;
   second means for supporting at least two sides of said bundle, said supporting means being positioned above said turntable and engaging said bundle prior to the rotation of said turntable by said first means, thereby to prevent skewing of said loosely stacked newspapers during said rotation, said support means releasing said bundles when said first means ceases to rotate said turntable;
   third means for conveying each of said first plurality of bundles in serial manner onto said turntable prior to rotation thereof; and
   a device for simultaneously transferring a row of a third plurality of rotated bundles onto a loading pallet, said transfer device including a rotatable shaft;
   a flap of generally rectangular shape having a first pair of opposed ends and a second pair of opposed sides formed thereof, the dimensions of each of said second pair of sides being greater than the length of said bundle row, a first side of said being rigidly affixed to said rotatable shaft;
   fourth means for pivoting said flap through a substantially semicircular arc above a horizontal plane through the longitudinal axis of said shaft, said fourth means adapted to maintain a top surface of said flap in an essentially horizontal plane prior to the initiation of a pivoting motion;

a gripping device attached to said first side of said flap, said gripping device being movable between a position partly enclosing an entire row of bundles positioned upon said flap and an open position at right angles to said enclosing position, said gripping device in the enclosing position firmly clamping an enclosed edge of said entire row of bundles;

fifth means for conveying said third plurality of rotated bundles onto said flap in a serial manner to form said row of bundles; and sixth means for carrying said pallet.

8. An arrangement as defined in claim 7, further comprising seventh means for disengaging said pivoting flap from said driving mechanism during the latter part of the rotation of said pivoting flap about said shaft, whereby said shaft performs a free falling motion.

9. An arrangement as defined in claim 7, wherein at least one of said transfer device and said pallet carrying device further comprise eighth means for causing movement of one of said devices relative to the other of said devices in a direction perpendicular to the longitudinal axis of said shaft, said pallet being situated below the position occupied by said pivoting flap at the end of the rotation of said pivoting flap about said shaft.

10. An arrangement as defined in claim 7, further comprising ninth means for moving at least one of said transfer device and said pallet in a vertical direction relative to the other of said devices, with said pallet being situated below the position occupied by said pivoting flap at the end of the rotation of said pivoting flap about said shaft.

* * * * *